(12) United States Patent
Goupil, Jr. et al.

(10) Patent No.: US 7,241,215 B2
(45) Date of Patent: Jul. 10, 2007

(54) FABRIC VALVE FOR VEHICLE CLIMATE CONTROL SYSTEM

(75) Inventors: Gerald M. Goupil, Jr., N. Tonawanda, NY (US); Mark W. Stevenson, Appleton, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/190,451

(22) Filed: Jul. 27, 2005

(65) Prior Publication Data
US 2007/0026787 A1    Feb. 1, 2007

(51) Int. Cl.
*F24F 7/00* (2006.01)
(52) U.S. Cl. ...................... 454/121; 454/139
(58) Field of Classification Search ........ 454/121–127, 454/156, 139, 153, 155; 165/103, 42, 43
See application file for complete search history.

(56) References Cited

U.S. PATENT DOCUMENTS

| 3,870,463 | A | 3/1975 | Werych |
| 5,396,799 | A | 3/1995 | Ross et al. |
| 5,895,843 | A | 4/1999 | Taylor et al. |
| 5,926,270 | A | 7/1999 | Longacre |
| 6,045,444 | A * | 4/2000 | Zima et al. .................. 454/121 |
| 6,403,417 | B1 | 6/2002 | Chien et al. |
| 6,547,152 | B1 * | 4/2003 | Pawlak, III ............ 237/12.3 B |
| 6,616,060 | B2 * | 9/2003 | Parisi et al. ........... 237/12.3 B |
| 6,730,187 | B1 | 5/2004 | Luedke |
| 6,958,009 | B2 * | 10/2005 | Shindou et al. ............. 454/139 |

* cited by examiner

*Primary Examiner*—Kenneth Rinehart
*Assistant Examiner*—Samantha Miller
(74) *Attorney, Agent, or Firm*—Patrick M. Griffin

(57) ABSTRACT

The invention provides a fabric valve assembly for a climate control system of a vehicle. The fabric valve assembly includes a housing positionable in a vehicle. The housing has at least one edge defining at least one housing aperture for directing movement of an air stream. The fabric valve assembly also includes a plastic frame defining at least one frame aperture. The plastic frame is operable to move between a first position parallel to and spaced from the at least one housing aperture and a second position spaced from the first position. The fabric valve assembly also includes a cloth member fixedly engaged with the plastic frame. The cloth member extends taut relative to the at least one frame aperture to close and seal the at least one housing aperture when the plastic frame is in the first position.

9 Claims, 3 Drawing Sheets

FABRIC VALVE FOR VEHICLE CLIMATE CONTROL SYSTEM

FIELD OF THE INVENTION

The invention relates to a climate control system for a vehicle and more particularly to a valve assembly for controlling airflow through the climate control system.

BACKGROUND OF THE INVENTION

Conventional heating, ventilation and air conditioning (HVAC) systems for vehicles generally include a housing, an evaporator, a heater core having a housing, an evaporator assembly coupled to the housing, an evaporator, a heater core, an air inlet, a fan and various doors or mode valves for controlling the volume and direction of air flow and generating outlet air of a desired volume and temperature. Together these components receive, temper and direct the flow of forced air through several outlets or vents in the vehicle. The outlets through which the forced air ultimately exits are determined by the various doors which move between open and closed positions and cause air flow to be forced in one direction or another or a combination of both. Air may be directed to various areas of the car depending on the state of the mode valves. For example, air may be forced through outlets directed at the windshield in a defrost or defog mode, or through outlets directed at mid-height level in an air-conditioning mode, or to lower outlets directed to the floor in a heat mode, or various combinations thereof. Although, air of any temperature may be directed to and through any of them.

More recently, designs utilizing a flexible film or fabric or cloth valve rather than doors have been proposed for controlling volume and direction of air flow. Generally, the flexible film valve is disposed in a frame having rollers. The flexible film valve includes various apertures formed therein, is rolled back and forth over a first roller to cover or uncover various openings and may include an actuator for controlling the roller to wind and unwind the film valve.

SUMMARY OF THE INVENTION

The invention provides a fabric valve assembly for a climate control system of a vehicle. The fabric valve assembly includes a housing positionable in a vehicle. The housing has at least one edge defining at least one housing aperture for directing movement of an air stream. The fabric valve assembly also includes a plastic frame defining at least one frame aperture. The plastic frame is operable to move between a first position parallel to and spaced from the at least one housing aperture and a second position spaced from the first position. The fabric valve assembly also includes a cloth member fixedly engaged with the plastic frame. As used herein, the cloth member could be a textile structure produced by interlacing yarns, fibers or filaments. Alternatively, the cloth member could be a textile structure that is comprised of a woven or non-woven fabric that has been coated with a substance such as a lacquer, plastic, resin, rubber or varnish that has been applied in firmly adhering layers to provide certain properties, such as air impermeability. Alternatively, the cloth member could be a film or film-like structure made directly from a polymer solution in a dense, firm, sheet form or any combination of the above. The cloth member extends taut relative to the at least one frame aperture to close and seal the at least one housing aperture when the plastic frame is in the first position.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
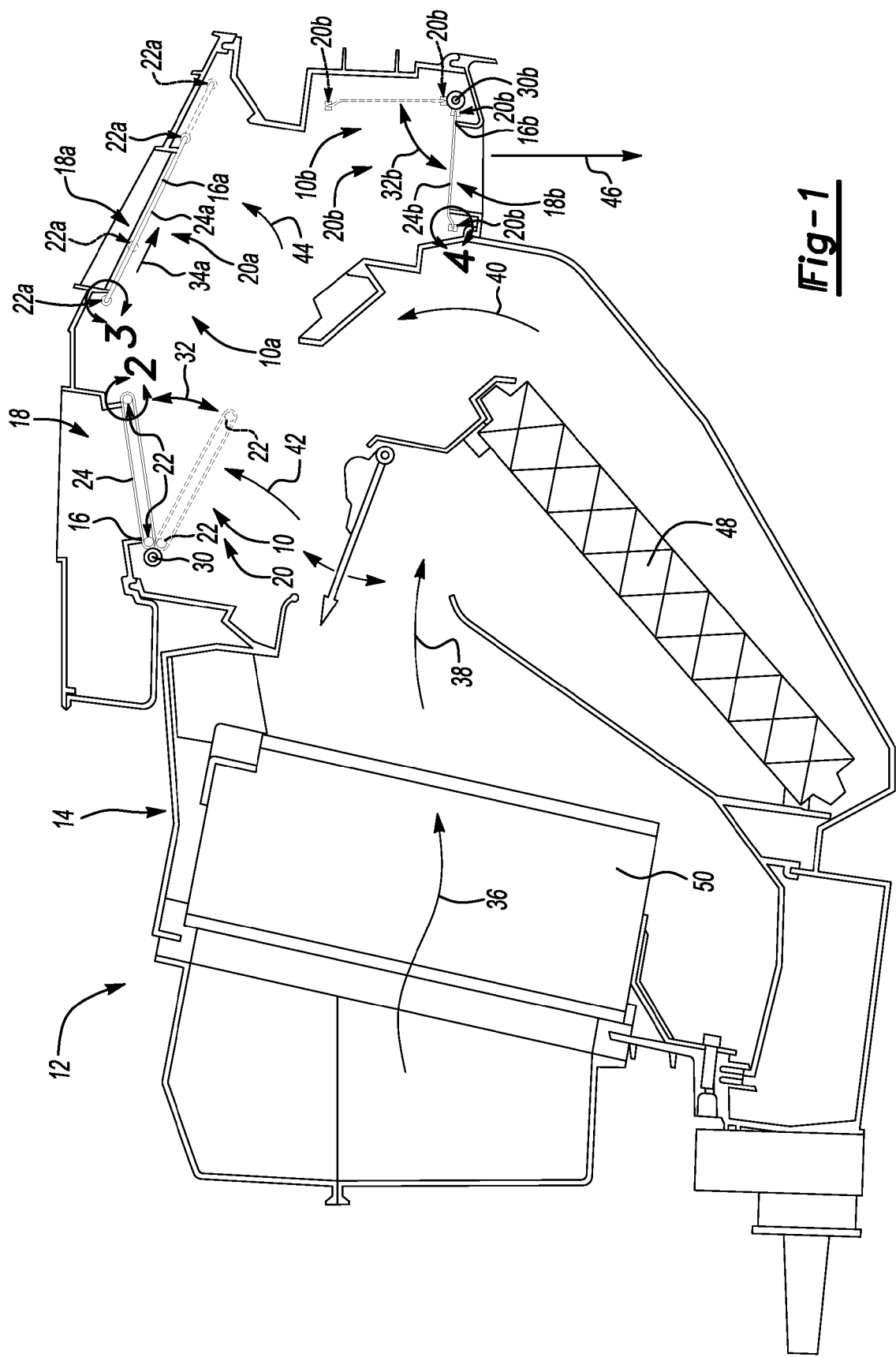
FIG. 1 is a schematic cross-sectional view of a climate control system of a vehicle.

A plurality of different embodiments of the invention are shown in the Figures of the application. Similar features are shown in the various embodiments of the invention. Similar features have been numbered with a common reference numeral and have been differentiated by an alphabetic designation. Also, to enhance consistency, features in any particular drawing share the same alphabetic designation even if the feature is shown in less than all embodiments. Similar features are structured similarly, operate similarly, and/or have the same function unless otherwise indicated by the drawings or this specification. Furthermore, particular features of one embodiment can replace corresponding features in another embodiment unless otherwise indicated by the drawings or this specification.

Referring now to FIG. 1, a climate control system 12 can be disposed in a vehicle to control conditions associated with air inside a passenger compartment of a vehicle. The exemplary climate control system 12 includes a housing 14 defining a plurality of passageways directing movement of air steams 36, 38, 40, 42, 44, 46. The exemplary climate control system 12 also includes a pair of heat exchangers 50 and 48 to communicate thermal energy from air streams 36 and 38.

Figure 2:
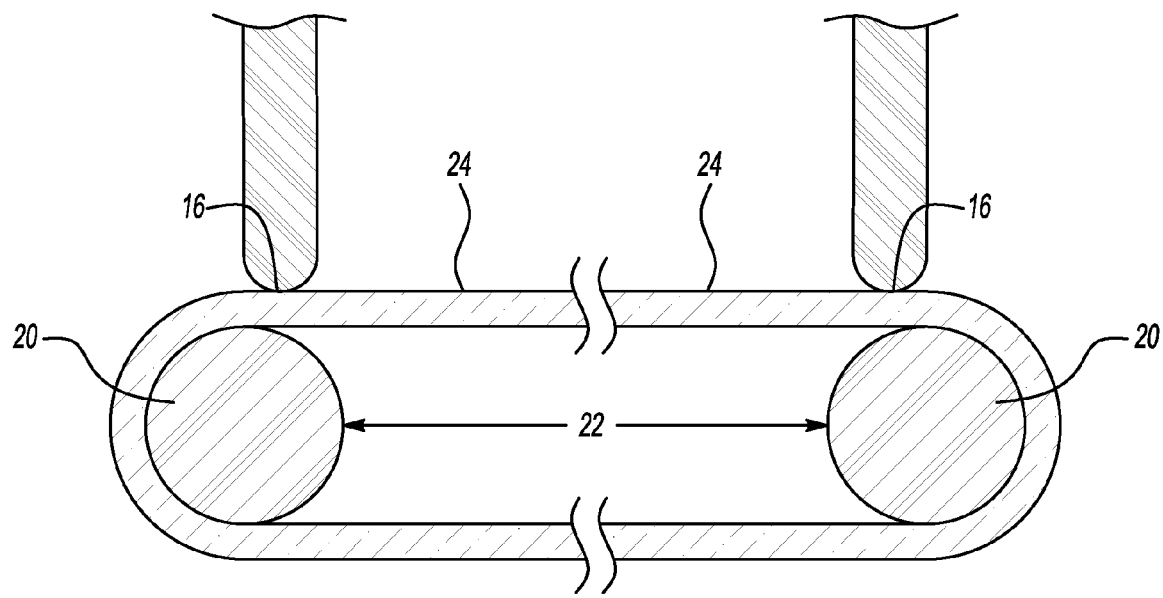
FIG. 2 is a detail view of a first exemplary fabric valve assembly taken along detail line 2 in FIG. 1.

The climate control system 12 of a vehicle includes three exemplary fabric valve assemblies 10, 10a, 10b. Referring now to FIGS. 1 and 2, a first exemplary fabric valve assembly 10 includes the housing 14. The housing 14 includes an edge 16 defining at least one housing aperture 18. The aperture 18 directs movement of an air stream 42 out of the housing 14.

The fabric valve assembly 10 also includes a plastic frame 20 disposed in the housing 14 and defining at least one frame aperture 22. The plastic frame 20 is operable to move with the frame aperture 22 relative to the housing 14 between a first position parallel to and spaced from the at least one housing aperture 18 (shown in solid line) and a second position spaced from the first position (shown in phantom). The plastic frame 20, 20b is supported for pivoting movement 32 about a pivot axis 30. The pivot axis 30 extends substantially parallel to a plane defined by the at least one housing aperture 18.

The fabric valve assembly 10 also includes a cloth member 24 without apertures substantially fixedly engaged with the plastic frame 20. The cloth member 24 encircles the plastic frame 20. The cloth member 24 could be formed from heat shrinkable material, but is not limited to heat shrinkable material. During assembly to the cloth member is slipped over the plastic frame 20 and heat can then be applied to shrink the cloth member 24 taut about the plastic frame.

Alternatively, the cloth member 24 can include an elastic portion (not shown) to allow the cloth member 24 to extend during assembly with the plastic frame 20 and remain taut in operation.

The cloth member 24 extends taut relative to and across the at least one frame aperture 22 to close and seal the at least one housing aperture 18 when the plastic frame 20 is in the first position. The cloth member 24 seals the housing aperture 18 by contacting and touching the edge 16 when the plastic frame 20 is in the first position thereby closing the housing aperture 18. As shown in FIG. 1, the cloth member 24 is pinched between the plastic frame 20 and the edge 16. In the first exemplary fabric valve 10, the cloth member 24 is disposed between the at least one edge 16 and the plastic frame 20 along an area of contact between the cloth member 24 and the at least one edge 16, as best shown in FIG. 2.

Figure 3:
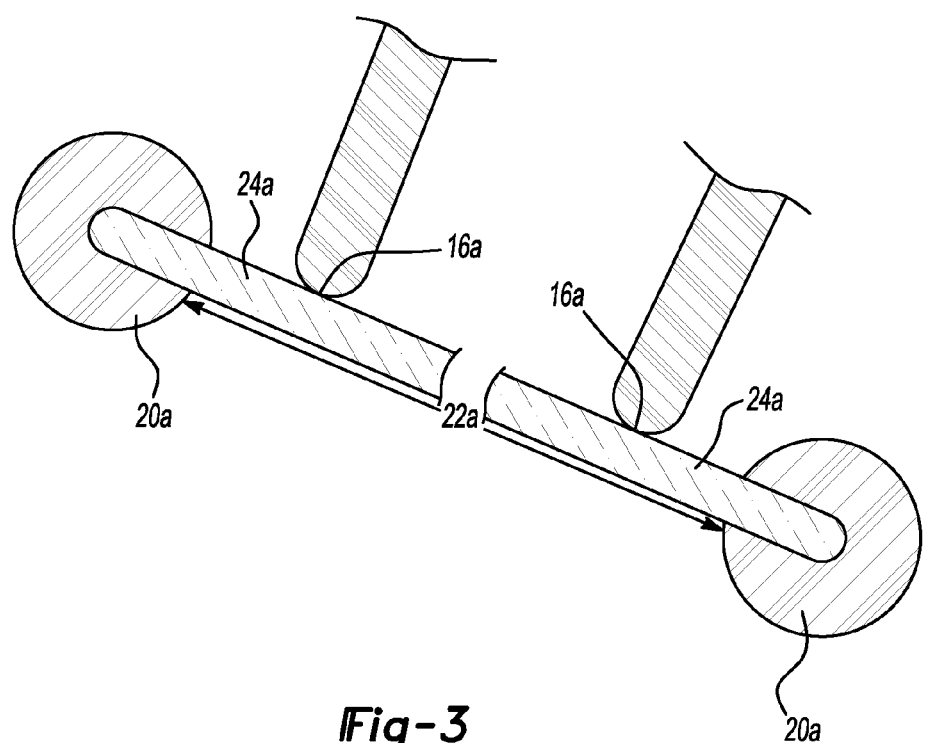
FIG. 3 is a detail view of a second exemplary fabric valve assembly taken along detail line 3 in FIG. 1.

Referring now to FIGS. 1 and 3, a second exemplary fabric valve assembly 10a also includes the housing 14. The housing 14 includes an edge 16a defining at least one housing aperture 18a. The aperture 18a directs movement of an air stream 44 out of the housing 14. The fabric valve assembly 10a also includes a plastic frame 20a defining at least one frame aperture 22a. The plastic frame 20a is operable to move between a first position parallel to and spaced from the at least one housing aperture 18a (shown in solid line) and a second position spaced from the first position (shown in phantom). The plastic frame 20a is supported for translating movement 34a between the first and second positions. The fabric valve assembly 10a also includes a cloth member 24a substantially fixedly engaged with the plastic frame 20a. The plastic frame 20a is injection molded and the cloth member 24a is disposed in situ and thereby embedded with respect to the plastic frame 20a. The cloth member 24a extends taut relative to the at least one frame aperture 22a to close and seal the at least one housing aperture 18a when the plastic frame 20a is in the first position. The cloth member 24a seals the at least one housing aperture 18a by contacting the edge 16a when the plastic frame 20a is in the first position. In the second exemplary fabric valve assembly 10a, the frame aperture 22a is larger than the housing aperture 18a and surrounds an area of contact between the cloth member 24a and the at least one edge 16a, as best shown in FIG. 3.

Figure 4:
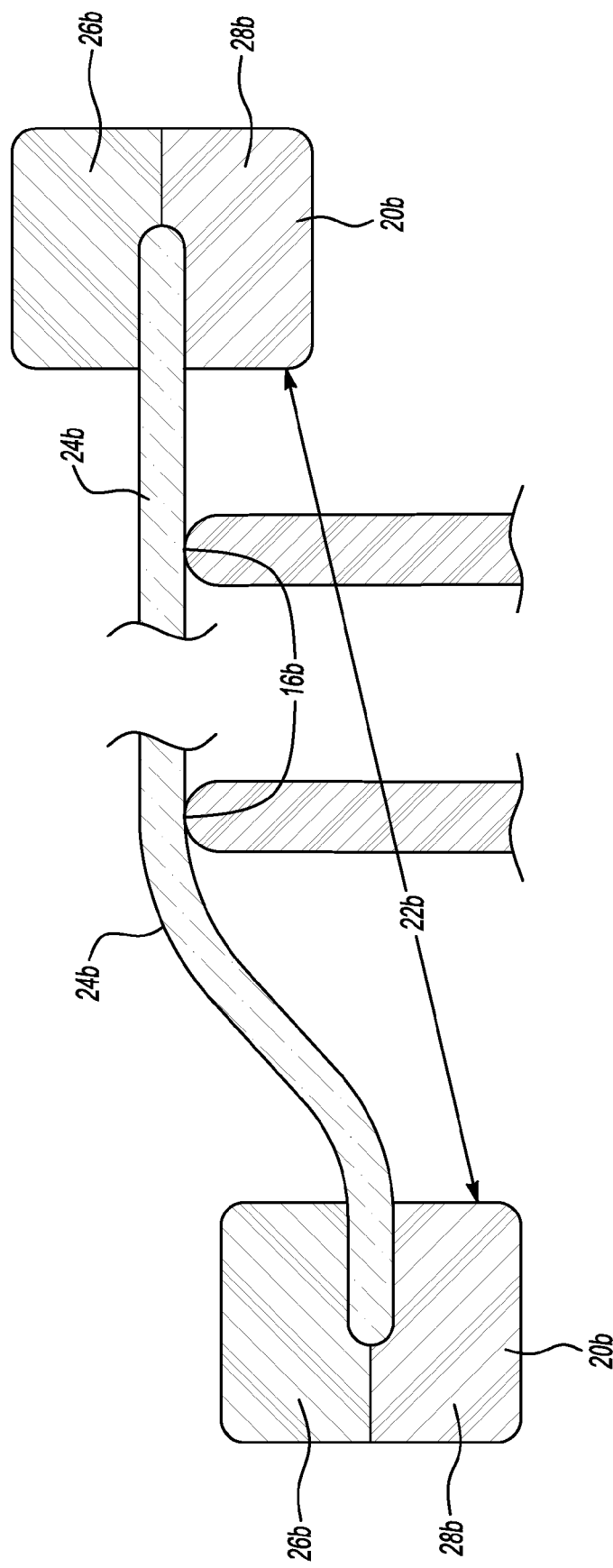
FIG. 4 is a detail view of a third exemplary fabric valve assembly taken along detail line 4 in FIG. 1.

Referring now to FIGS. 1 and 4, a third exemplary fabric valve assembly 10b also includes the housing 14. The housing 14 includes an edge 16b defining at least one housing aperture 18b. The aperture 18b directs movement of an air stream 46 out of the housing 14. The fabric valve assembly 10b also includes a plastic frame 20b defining at least one frame aperture 22b. The plastic frame 20b is operable to move between a first position parallel to and spaced from the at least one housing aperture 18b (shown in solid line) and a second position spaced from the first position (shown in phantom). The plastic frame 20b is supported for pivoting movement 32b about a pivot axis 30b. The fabric valve assembly 10b also includes a cloth member 24b substantially fixedly engaged with the plastic frame 20b. The plastic frame 20b has first and second halves 26b, 28b separately formed from one another. The cloth member 24b is positioned between the first and second halves 26b, 28b when the first and second halves 26b, 28b are joined together. The cloth member 24b extends taut relative to the at least one frame aperture 22b to close and seal the at least one housing aperture 18b when the plastic frame 20b is in the first position. The cloth member 24b seals the housing aperture 18b by contacting the edge 16b when the plastic frame 20b is in the first position. The frame aperture 22b is larger than the 18b and surrounds an area of contact between the cloth member 24b and the at least one edge 16b.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A fabric valve assembly for a climate control system of a vehicle comprising:

a housing positionable in a vehicle and having at least one edge defining at least one housing aperture for directing movement of an air stream;

a plastic frame disposed in said housing defining at least one frame aperture and operable to move with said at least one frame aperture relative to said housing between a first position parallel to and spaced from said at least one housing aperture and a second position spaced from said first position; and a cloth member without apertures substantially fixedly engaged with said plastic frame and extending taut across said at least one frame aperture to close and seal said at least one housing aperture when said plastic frame is in said first position.

2. The fabric assembly of claim 1 wherein said cloth member is further defined as sealing said at least one housing aperture by contacting and touching said at least one edge of said housing when said plastic frame is in said first position thereby closing said at least one housing aperture.

3. The fabric valve assembly of claim 2 wherein said at least one frame aperture is larger than said at least one housing aperture and surrounds an area of contact between said cloth member and said at least one edge of said housing when said plastic frame and said at least one frame aperture are in said first position.

4. The fabric valve assembly of claim 2 wherein said cloth member is further defined as substantially encircling said plastic frame and is disposed and pinched between said at least one edge of said housing and said plastic frame along an area of contact between said cloth member and said at least one edge of said housing when said plastic frame and said at least one frame aperture are in said first position.

5. The fabric valve assembly of claim 1 wherein said cloth member is further defined as being formed from heat shrinkable material.

6. The fabric valve assembly of claim 1 wherein said plastic frame is further defined as being injection molded and said cloth member is further defined as being disposed in situ with respect to said plastic frame whereby an edge of said cloth member is embedded in said plastic frame.

7. The fabric valve assembly of claim 1 wherein said plastic frame is further defined as having first and second halves separately formed from one another and said cloth member is further defined as being positioned between and contacting both of said first and second halves when said first and second halves are joined together.

8. The fabric valve assembly of claim 1 wherein said plastic frame is further defined as being supported for pivoting movement such that said plastic frame and said at least one frame aperture rotate between said first and second positions about a pivot axis extending substantially parallel to a plane defined by said at least one housing aperture.

9. The fabric valve assembly of claim 1 wherein said plastic frame is further defined as being supported for translating movement such that said plastic frame and said at least one frame aperture move without rotation or angular displacement between said first and second positions.

* * * * *